UNITED STATES PATENT OFFICE.

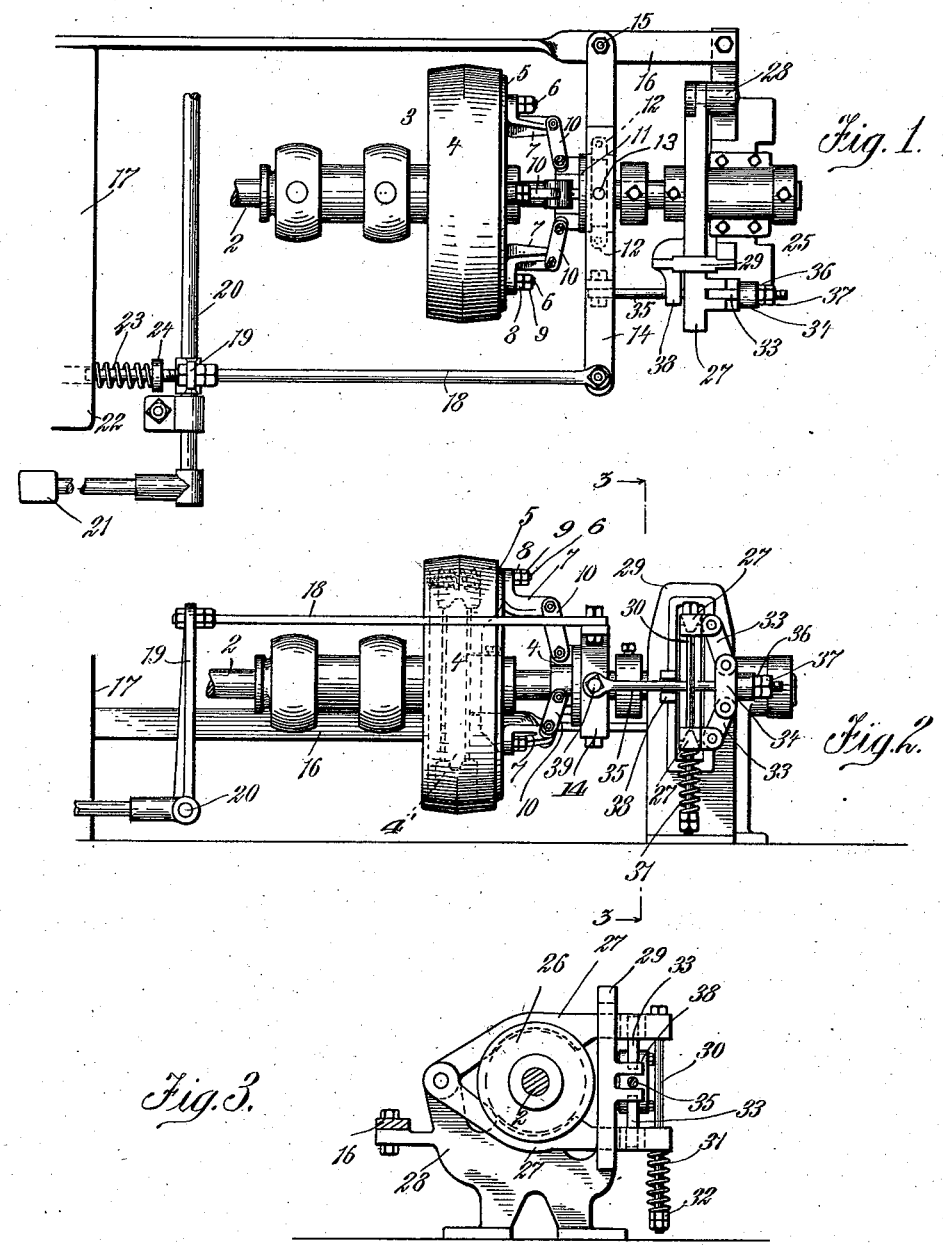

FRED ELVERTON SUTHERLAND AND JAMES ANDREW BROWN, OF LOS ANGELES, CALIFORNIA.

SHIFTER MECHANISM.

1,028,503. Specification of Letters Patent. Patented June 4, 1912.

Original application filed May 27, 1909, Serial No. 498,765. Divided and this application filed February 28, 1910. Serial No. 546,554.

*To all whom it may concern:*

Be it known that we, FRED E. SUTHERLAND and JAMES A. BROWN, both citizens of the United States of America, residing at Los Angeles, in the county of Los Angeles, State of California, have invented a certain new and useful Shifter Mechanism; and we do hereby declare the following to be a full, clear, and exact description of the invention, such as will enable others skilled in the art to which it appertains to make and use the same.

This application is a division of application Serial No. 498,765 filed May 27, 1909. This invention relates to shifter mechanism connected in common with clutch and brake mechanisms and consists in the novel construction, arrangement, and combination of the parts and mechanisms hereinafter described and set forth in the appended claim.

The object and the advantages of the invention will be apparent to those skilled in the art from a consideration of the following description of one form of construction in which the invention may be embodied, taken in connection with the accompanying drawings, in which—

Figure 1 is a plan view illustrative of the embodiment of the invention in one form of construction and arrangement of the parts of the mechanisms. Fig. 2 is a side elevation of parts shown in Fig. 1, and Fig. 3 is a view taken on line 3—3 of Fig. 2.

As shown in the drawings, on main shaft 2 is mounted the clutch mechanism 3 which may consist of a driving member 4 and a member 4' driven thereby in consequence of frictional means associated therewith being brought into play when the plate 5 is moved against spring pressure toward the driving member. An extended description of the clutch mechanism is not deemed necessary in the case as suitable mechanism is fully described in the application above referred to and in application Serial No. 527,086, filed Nov. 9, 1909.

The studs 6 have loosely mounted thereon the ends of levers 7 and their ends projecting beyond the levers 7 each have a nut 8 and a lock nut 9. The end of each lever 7 remote from studs 6 is jointedly connected to one end of toggle links 10, the other ends of said toggle links being jointedly connected to a collar 11 slidably mounted on shaft 2.

With the above construction, when the collar 11 is moved toward plate 5 the latter is moved to actuate the frictional means of the clutch to establish an operative connection between the driving and driven members of the clutch. On collar 11 is freely mounted a yoke 12 having trunnions 13 pivotally engaged by a shifter 14. One end of shifter 14 is held stationary by a pivot 15 affixed to bar 16 attached to a stationary part 17. The movable end of shifter 14 may be attached to a rod 18 connected to pedal-lever 19 mounted on pedal-shaft 20 to which may be attached a pedal 21. Rod 18 is slidably mounted at its forward end on a stationary part 22 and has a spring 23 which reacting between said stationary part and a collar 24 on the rod, normally presses the latter to a position to disengage the clutch.

The brake 25 may comprise a wheel 26 mounted on main shaft 2 and engaged by shoe-levers 27 pivotally attached at one end to brake frame 28, their movable end portions passing between the sides of a guide 29 on said frame. The shoe portion of the levers may be normally held toward each other and in contact with the wheel 26 by means of a bolt 30 passing through holes in their movable ends and having a spring 31 interposed between one of the levers and a nut 32 on the bolt. The ends of the levers are moved against the action of spring 31 by means of toggle-links 33 connected at their ends to the shoe-levers 27 and to a yoke 34 loosely mounted on rod 35 and held from longitudinal movement on said rod by nut 36 and lock-nut 37. Rod 35 slides on a guide 38 on frame 28 and is attached to shifter 14 by bolt 39.

From the foregoing it will readily be apparent that when pedal 21 is depressed the brake is released and the clutch engaged, and upon the pedal being released the clutch is disengaged and the brake actuated.

We claim:

A brake mechanism including a frame formed with a bearing and provided upon one side thereof with a slotted guideway and upon the opposite side thereof with an extension, a guide member being arranged upon the slotted guideway at the middle portion thereof, a shaft journaled within the bearing of the frame and provided with a brake wheel, a pair of brake levers pivoted upon the extended portion of the frame and adapted to engage the brake wheel of the shaft, the swinging ends of the shoe levers passing loosely through the slotted guideway, a rod arranged at substantially right angles to the brake levers and slidably mounted upon the before mentioned guide member, a pair of toggle levers connecting the rod to the shoe levers, and means for sliding the said rod for actuating the shoe levers.

In testimony whereof, we have signed our names to this specification in the presence of two subscribing witnesses at Los Angeles, county of Los Angeles, State of California, this 23rd day of February, A. D. 1910.

FRED ELVERTON SUTHERLAND.
JAMES ANDREW BROWN.

Witnesses:
ALEX CURRIE,
A. H. LIDDERS.

Copies of this patent may be obtained for five cents each, by addressing the "Commissioner of Patents, Washington, D. C."